US009437326B2

(12) United States Patent
Razzaz et al.

(10) Patent No.: US 9,437,326 B2
(45) Date of Patent: Sep. 6, 2016

(54) MARGIN TOOL FOR DOUBLE DATA RATE MEMORY SYSTEMS (71) Applicant: Freescale Semiconductor, Inc., Austin, TX (US)

(72) Inventors: Mazyar Razzaz, Austin, TX (US); Kenneth R. Burch, Austin, TX (US); James A. Welker, Leander, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/302,609

(22) Filed: Jun. 12, 2014

(65) Prior Publication Data

US 2015/0364212 A1 Dec. 17, 2015

(51) Int. Cl.
*G11C 29/02* (2006.01)
*G11C 7/22* (2006.01)
*G06F 17/50* (2006.01)

(52) U.S. Cl.
CPC ......... *G11C 29/023* (2013.01); *G06F 17/5068* (2013.01); *G11C 29/022* (2013.01); *G11C 29/028* (2013.01); *G06F 2217/84* (2013.01); *G11C 7/22* (2013.01)

(58) Field of Classification Search
USPC ........................................................ 365/193
See application file for complete search history.

(56) References Cited

U.S. PATENT DOCUMENTS

| | | | |
|---|---|---|---|
| 7,036,053 B2 * | 4/2006 | Zumkehr et al. | 714/709 |
| 7,171,321 B2 * | 1/2007 | Best | G06F 13/1689 365/189.07 |
| 7,975,164 B2 | 7/2011 | Lee et al. | |
| 2005/0259774 A1 * | 11/2005 | Garlepp | H04L 1/20 375/355 |
| 2006/0227912 A1 * | 10/2006 | Leibowitz et al. | 375/350 |
| 2009/0307521 A1 * | 12/2009 | Lee et al. | 713/601 |
| 2012/0140426 A1 * | 6/2012 | Ho et al. | 361/760 |
| 2014/0293718 A1 * | 10/2014 | Prakash | G06F 3/0418 365/193 |

OTHER PUBLICATIONS

Oh et al., "On-Chip Link Measurement Techniques," *High-Speed Signaling: Jitter Modeling, Analysis, and Budgeting*, Prentice Hall Modern Semiconductor Design Series, Prentice Hall Signal Integrity Library, Chapter 16, Section 16.1, pp. 405-408, Copyright 2012.
JEDEC Standard, Double Data Rate (DDR) SDRAM Specification, JESD79E (Revision of JESD79D), JEDEC Solid State Technology Association, May 2005.
General DDR SDRAM Functionality, TN-46-05, Rev. A, Pub. Jul. 2001, Copyright 2001, Micron Technology, Inc., (11 pages).

* cited by examiner

*Primary Examiner* — Anthan Tran
*Assistant Examiner* — Mushfique Siddique (57) ABSTRACT A tool for testing a double data rate ("DDR") memory controller to ensure that data strobe transitions are aligned with data eyes to achieve a desired data integrity during data transfers between the memory controller and the memories. After the memory controller completes its training sequence during the initialization process, the tool sweeps the data strobe transition across the data eye. At each timing step during the sweep, several tests may be conducted to check for integrity of functionality. The tool thus generates a pass/fail margin table. The locations of the data strobe transitions selected by the memory controller during its previously run training sequence are then added to this tool-generated margin table. The result is essentially a pseudo data eye, reconstructed including the data strobe transition with the data eye. An inspection of the location of the data strobe transition with the data eye may be utilized to show the range of timing steps available before the data strobe transition would fail to capture valid data from the incoming data eye.

22 Claims, 7 Drawing Sheets

| STEP | BYTE LANES | | | | | | | | ECC |
|---|---|---|---|---|---|---|---|---|---|
| | 0 | 1 | 2 | 3 | 4 | 5 | 6 | 7 | |
| 1 | FAIL | FAIL | FAIL | FAIL | FAIL | FAIL | FAIL | FAIL | FAIL |
| 2 | FAIL | FAIL | FAIL | FAIL | FAIL | FAIL | FAIL | FAIL | FAIL |
| 3 | FAIL | FAIL | FAIL | FAIL | FAIL | FAIL | PASS | FAIL | PASS |
| 4 | FAIL | PASS | FAIL | PASS | FAIL | FAIL | PASS | FAIL | PASS |
| 5 | FAIL | PASS | FAIL | PASS | FAIL | FAIL | PASS | PASS | PASS |
| 6 | PASS | PASS | PASS | PASS | FAIL | PASS | PASS | PASS | PASS |
| 7 | PASS | PASS | PASS | PASS | FAIL | PASS | PASS | PASS | PASS |
| 8 | PASS | PASS | PASS | PASS | PASS | PASS | PASS | PASS | PASS |
| 9 | PASS | PASS | PASS | PASS | PASS | PASS | DQS | PASS | PASS |
| 10 | PASS | DQS | PASS | DQS | PASS | PASS | PASS | PASS | DQS |
| 11 | DQS | PASS | PASS | PASS | PASS | DQS | PASS | PASS | PASS |
| 12 | PASS | PASS | DQS | PASS | PASS | PASS | PASS | DQS | PASS |
| 13 | PASS | PASS | PASS | PASS | DQS | PASS | PASS | PASS | PASS |
| 14 | PASS | PASS | PASS | PASS | PASS | PASS | PASS | PASS | PASS |
| 15 | PASS | PASS | PASS | PASS | PASS | PASS | PASS | PASS | PASS |
| 16 | PASS | PASS | PASS | PASS | PASS | PASS | FAIL | PASS | PASS |
| 17 | FAIL | FAIL | PASS | PASS | FAIL | FAIL | FAIL | PASS | PASS |
| 18 | FAIL | FAIL | FAIL | FAIL | FAIL | FAIL | FAIL | PASS | FAIL |
| 19 | FAIL | FAIL | FAIL | FAIL | FAIL | FAIL | FAIL | FAIL | FAIL |
| 20 | FAIL | FAIL | FAIL | FAIL | FAIL | FAIL | FAIL | FAIL | FAIL |

FIG. 5

| STEP | BYTE LANES | | | | | | | | ECC | |
|---|---|---|---|---|---|---|---|---|---|---|
| | 0 | 1 | 2 | 3 | 4 | 5 | 6 | 7 | | |
| 1 | FAIL | FAIL | FAIL | FAIL | FAIL | FAIL | FAIL | FAIL | FAIL | |
| 2 | FAIL | FAIL | FAIL | FAIL | FAIL | FAIL | FAIL | FAIL | FAIL | |
| 3 | FAIL | FAIL | FAIL | FAIL | FAIL | FAIL | FAIL | FAIL | FAIL | |
| 4 | FAIL | FAIL | FAIL | FAIL | FAIL | FAIL | FAIL | FAIL | FAIL | |
| 5 | FAIL | FAIL | FAIL | FAIL | FAIL | FAIL | FAIL | FAIL | FAIL | |
| 6 | FAIL | FAIL | PASS | PASS | PASS | FAIL | FAIL | FAIL | PASS | ⎫ |
| 7 | PASS | PASS | PASS | PASS | PASS | FAIL | FAIL | PASS | PASS | ⎬ MARGIN A |
| 8 | PASS | PASS | PASS | PASS | PASS | FAIL | FAIL | PASS | PASS | |
| 9 | PASS | PASS | PASS | PASS | PASS | PASS | DQS | PASS | PASS | ⎭ |
| 10 | PASS | DQS | PASS | DQS | PASS | PASS | FAIL | PASS | DQS | |
| 11 | DQS | PASS | PASS | PASS | PASS | DQS | PASS | PASS | PASS | ⎬ MARGIN B |
| 12 | PASS | PASS | DQS | PASS | FAIL | PASS | PASS | DQS | PASS | |
| 13 | PASS | PASS | PASS | PASS | DQS | PASS | PASS | PASS | FAIL | |
| 14 | PASS | FAIL | FAIL | PASS | FAIL | PASS | PASS | PASS | FAIL | |
| 15 | FAIL | FAIL | FAIL | FAIL | FAIL | FAIL | PASS | PASS | FAIL | |
| 16 | FAIL | FAIL | FAIL | FAIL | FAIL | FAIL | PASS | PASS | FAIL | |
| 17 | FAIL | FAIL | FAIL | FAIL | FAIL | FAIL | PASS | PASS | FAIL | |
| 18 | FAIL | FAIL | FAIL | FAIL | FAIL | FAIL | PASS | PASS | FAIL | |
| 19 | FAIL | FAIL | FAIL | FAIL | FAIL | FAIL | PASS | FAIL | FAIL | |
| 20 | FAIL | FAIL | FAIL | FAIL | FAIL | FAIL | FAIL | FAIL | FAIL | |

MARGIN TOOL FOR DOUBLE DATA RATE MEMORY SYSTEMS

TECHNICAL FIELD

This application relates in general to circuits that interface with dynamic memories, and in particular double data rate ("DDR") memories.

BACKGROUND INFORMATION

Double data rate ("DDR") dynamic random-access ("DRAM") memory (hereinafter referred to as "DDR memory") is a class of memory integrated circuits used in computing systems. DDR memory uses a clocking technique whereby two data bits are transferred per clock cycle, or once every clock edge, to significantly improve speed. DDR memory controller circuits may reside on a processor, ASSP, or ASIC semi-conductor device, or alternately may reside on semiconductor devices dedicated solely to the purpose of controlling DDR memories. The higher speed of DDR memories makes signal integrity, low phase-locked loop ("PLL") jitter, and fast register propagation delay times increasingly critical. Thus, given these high clock rates and fast edge speeds, timing considerations become challenging; it is often the case that timing skews vary greatly from one system implementation to another, especially for systems with larger amounts of memory and a greater overall width of the memory bus.

In other words, the high speeds of DDR memories, and the very short valid data windows of DDR data, pose significant challenges when the memory controller is then implemented on a printed circuit board ("PCB") with the associated memories and other integrated circuit chips. The speeds at which the memory controller must reliably operate make the PCB layout challenging for the engineers and designers of such system boards. These difficulties arise not from a functionality issue, but from the physical realities of working with valid data windows that are well within the magnitude of signal propagation delays. These timing requirements are further complicated by the variation in logic speed over process, temperature, and voltage variations associated with the particular PCB on which the memory controller and DDR memories are implemented. In general, the industry has responded by moving towards memory controllers that attempt to calibrate themselves during a power-on initialization and training sequence in order for the timing controller to adapt to a given system implementation.

A problem with such training sequences is that they were designed and implemented into the memory controller when it was manufactured to operate under a limited set of parameters, which cannot take into account variations and/or deviations from such predetermined parameters when the PCB manufacturer integrates the memory controller with the DDR memories and other circuitry onto the PCB. Furthermore, such training techniques may not take into account all of the process and operating variations under which the PCB experiences in the field by the ultimate customers. For example, it is not practical to design such training sequences within the memory controller to incorporate wide and extreme variations in operating conditions of the final computing device while also striving to ensure that the memory controller is able to transfer data to/from the memory devices at the desired high speeds.

DETAILED DESCRIPTION

In a typical non-DDR memory system, both the memory controller and memory transmit or capture data in response to a single system clock. Compared to single data rate ("SDR") DRAM, the DDR DRAM interface makes higher transfer rates possible by more strict control of the timing of the electrical data and clock signals. However, implementations often have to use schemes such as phase-locked loops and self-calibration to reach the required timing accuracy. The interface uses double pumping (transferring data on both the rising and falling edges of the clock signal) to lower the clock frequency. The name "double data rate" refers to the fact that a DDR DRAM with a certain clock frequency achieves nearly twice the bandwidth of a SDR DRAM running at the same clock frequency, due to this double pumping.

As memory designers have moved to a DDR implementation of such systems, they achieved a 2× effective increase in the bit rate of the system. However, this effectively cut the valid data window (also referred to herein as a "data eye") in half. The result is that a more substantial piece of the timing budget for a memory cycle is now being taken up by the physical board routing delays and variations due to the temperature and voltage under which a particular PCB is implemented and operated.

Whereas before the data eye was relatively large, with the faster transfer frequencies associated with DDR memories, the data eye is much smaller, and increasingly shrinking. DDR memory interfaces rely on the use of a data strobe signal, referred to as a data query strobe ("DQS") signal, which can be either single-ended or differential. A DQS signal transition is used to capture a data signal from a received data eye. Data signals are referred to as "DQ" signals in the industry. A DQS signal is often generated from the differential system clock fed to the DDR memory and a delay-locked loop ("DLL") inside the DDR memory used to generate and align the DQS signal to the outgoing data. When a read operation is performed, the DDR memory outputs both data and a DQS signal transition edge-aligned with each other. In order to capture the data at the memory controller input registers with proper setup and hold times, the DQS signal from the memory needs to be phase shifted 90 degrees. This has the effect of "centering" the DQS signal transition edge with the center of the valid data window, providing maximum setup and hold time for capture of the incoming data. Thus, it is very important where to place the DQS signal transition in the data eye. Circuitry on memory controllers typically incorporates features into the physical interface of the memory controller circuit where the controller can adapt to system timing irregularities, wherein this adaptation is often calibrated during a power-on initialization and training sequence.

During such a training sequence of the DDR memory system, the circuitry in the memory controller is calibrated to center the DQS on the data eye each time the memory controller is powered on. As has been previously noted, such training techniques are not capable of anticipating variations in the implementation and operation of a PCB on which the memory controller and the DDR memories are installed. Such variations in implementation include, but are not limited to, differences between the multiple DDR memory chips to which the memory controller will interface, distances of the various transmission lines for command, address, data, and clock signals between the memory controller and the DDR memories, and the processes and manufacturing techniques utilized to connect such transmission lines to the input/output ("I/O") pins on the memory controller and the DDR memory chips. Examples of variations in operating parameters include, but are not limited to, power supply voltages and operating temperatures to which the PCB is subjected to.

As a result, manufacturers of such PCBs need to be able to further test the integrity of data transfers between the memory controller and the DDR memory chips after they have been installed on a PCB, and after being tested under various operating conditions desired by customers of the PCB manufacturer. That is, it is desired to know how much margin is available before the DDR interface would begin to fail. To date, PCB manufacturers have utilized an oscilloscope and logic analyzer connected to pins on the memory controller to look at exemplary data eyes to approximate where in the data eye the DQS signal transition is aligned after implementation on a PCB and under various operating conditions. The PCB manufacturer would then be able to make adjustments to the overall circuitry design, such as with the layout on the PCB between the memory controller and its associated DDR memories, in order to ensure that the DQS signal transition is approximately aligned in the center of the data eyes for each data byte lane to ensure that the transferred data is reliably captured at the receiver. However, such a testing technique utilizing an oscilloscope no longer works in a satisfactory manner because of the collapsing of the data eye to such a small level that it is so significantly distorted when viewed on the oscilloscope as to not provide a practical way for such PCB manufacturers to make the needed adjustments.

Therefore, embodiments of the present invention have been developed so that PCB manufacturers can satisfactorily know the DDR interface available timing margin when implementing the memory controller within their specific PCB and/or DDR memory system.

Aspects of the present invention provide a tool for use by such PCB manufacturers to perform the testing of the memory controller after implementation on a PCB and under various desired operating conditions to ensure that the DQS signal transitions are aligned with the data eyes to achieve a desired data integrity during data transfers between the memory controller and the memories. After the memory controller completes its training sequence during the initialization process, it then proceeds to come online for normal operation. Embodiments of the present invention implement a tool that stores the timing location of each DQS signal transition corresponding to its data byte lane established during the training sequence. Next, the tool sweeps the DQS signal transition across the data eye for each byte lane, using one or more incremental timing steps. In other words, as each READ operation is performed, the DQS signal transition is delayed by incrementally larger delay periods (or, the process may be performed in reverse by decrementing the delay steps) so that it attempts to read the data from its associated data eye. For example, the DQS signal transition may be delayed by 0+N nanosecond increments, where N equals the total width of the data eye divided by a positive integer (e.g., 20). Each of these delay increments is also referred to herein as a timing step, and the incrementing/decrementing of the timing steps is referred to as sweeping the DQS signal transition across the data eye.

At each timing step during the sweep, several tests may be conducted to check for integrity of functionality. When all the tests pass, the corresponding timing step is marked as PASS, which may be displayed as PASS in cells in a margin table generated by the tool. When one or more errors are detected, the cell is marked as FAIL, which may be displayed as FAIL in cells within the foregoing margin table.

After all byte lanes (or, depending upon the particular implementation, one or more nibble lanes, or even one or more single bit lanes) have gone through this process, the locations of the DQS signal transitions selected by the memory controller during its previously run training sequence are then added to this tool-generated margin table. The resulting display is essentially a pseudo data eye, reconstructed including the DQS signal transition with the data eye. A visual inspection of the location of the DQS signal transition with the data eye may be utilized to show the range of timing steps available before the DQS signal transition would fail to capture valid data from the incoming data eye.

Figure 1:
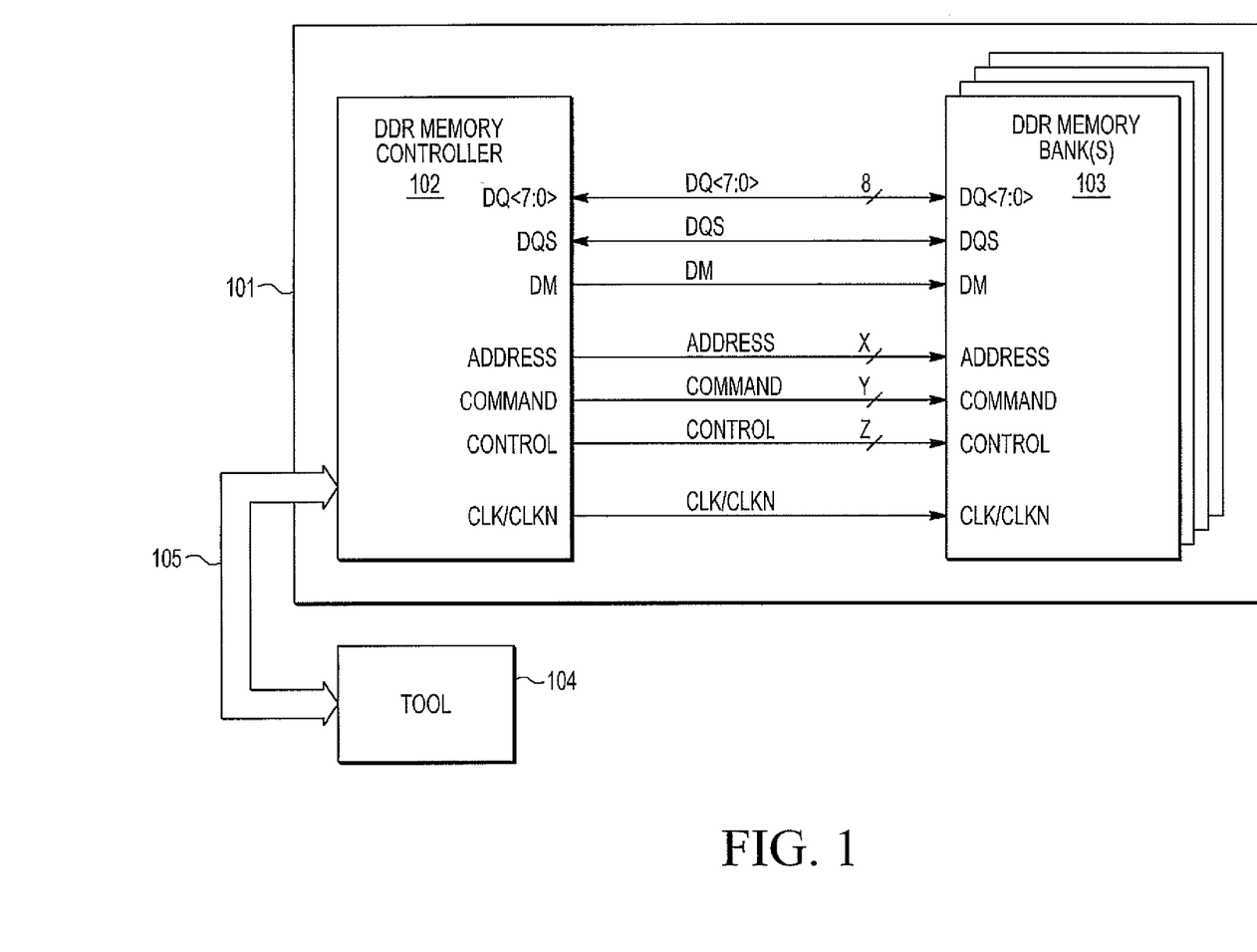
FIG. 1 illustrates a simplified block diagram of an exemplary embodiment of the present invention.

FIG. 1 illustrates an exemplary PCB 101, which has been implemented with a DDR memory controller 102 interfacing with one or more DDR memory bank(s) 103. Each of the DDR memory banks may be a DRAM, or any other equivalent memory device. As further described hereinafter, the PCB 101 may be implemented and operated within a data processing system 713.

As has been previously noted, the DDR memory system uses a double data rate architecture to achieve high-speed operation. The double data rate architecture essentially transfers two data words per clock cycle at the I/O pins of the memory chip. A bi-directional data strobe signal, referred to herein as the DQS signal, is transmitted externally, along with data (on the DQ lines), for use in data capture at the receiver (the DDR memory bank 103 in the case of WRITE operations ("WRITEs"), and the DDR memory controller 102 in the case of READ operations ("READs")). The DQS signal is transmitted by the DDR memory bank 103 during READs, and by the DDR memory controller 102 during WRITEs. The DQS signal transitions of the DQS signal are edge-aligned with the DQ data eye for READs and center-aligned with the DQ data eye for WRITEs. The DDR memory system operates with differential clock signals ("CLK/CLKN"), which can increase accuracy caused by clock jitter by using the crossing points of the differential clock signals.

READ and WRITE accesses to the DDR memory bank 103 are burst oriented; accesses start at a selected location and continue for a programmed number of locations in a programmed sequence. Accesses may begin with the registration of an ACTIVE command, which is then followed by a READ or WRITE command. Once a row has been activated or "opened," READ and WRITE commands are possible to that row. The address signals registered coincident with the ACTIVE command are used to select the bank and row to be accessed. The address signals registered coincident with the READ or WRITE command are used to select the bank and the starting column location for the burst access.

A DQS signal is typically generated for eight lanes of data to/from the DDR memory bank 103 (though embodiments of the present invention are not limited to such a number of lanes of data per DQS signal). Such an eight lanes of data may also be referred to herein as a byte lane. In the DDR memory bank 103, the DQS signal may be generated by a DLL (not shown) to minimize the skew between it and the data. A DDR memory system may also require a data mask ("DM") signal, which is used to mask data bytes during WRITE cycles.

Figure 2:
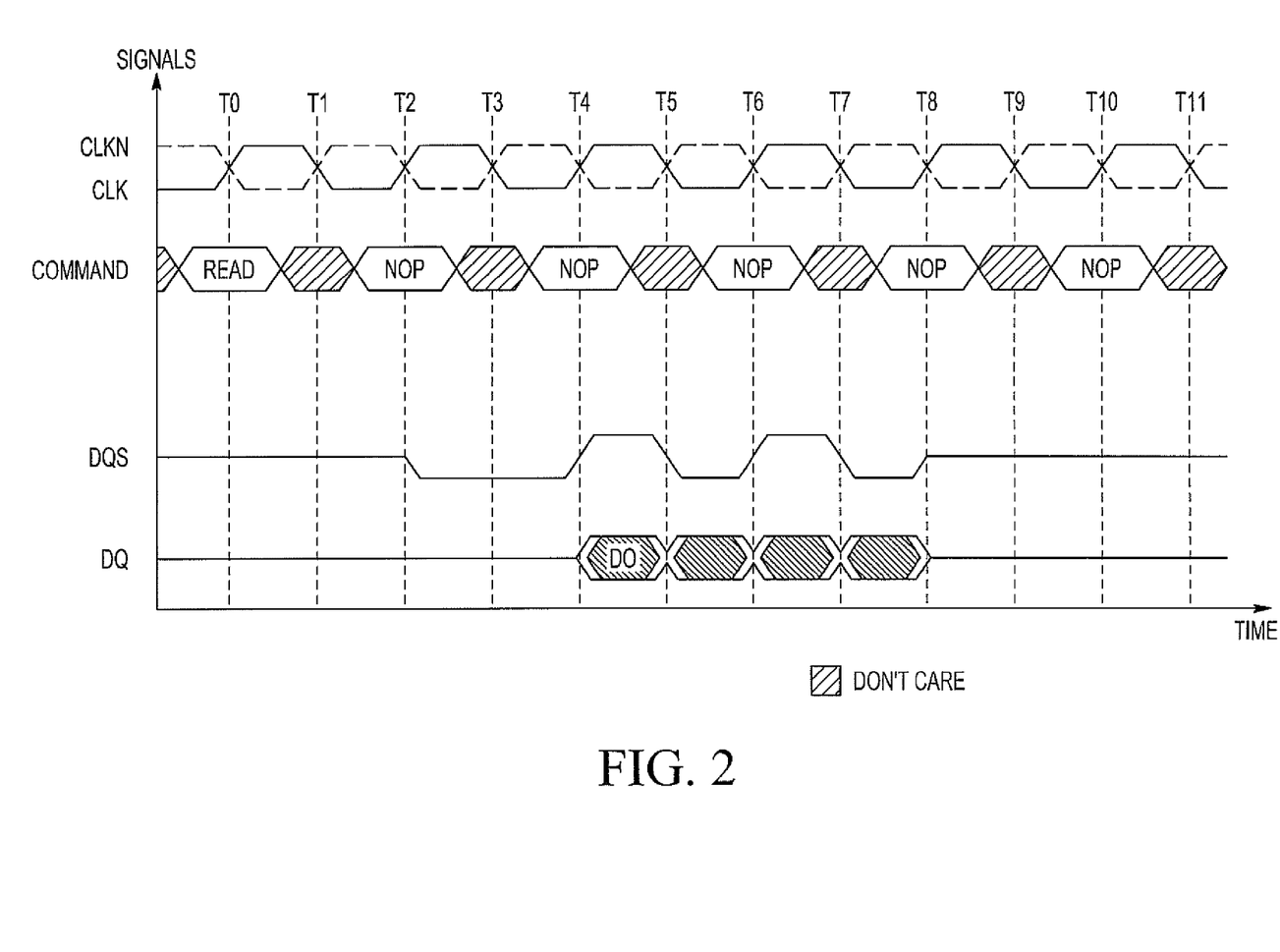
FIG. 2 illustrates an exemplary timing diagram for a READ transfer of data in a DDR memory system.

Referring to FIG. 2, there is illustrated a READ operation whereby a burst of data (in this example, the burst length equals four) is performed from the DDR memory bank 103 to the DDR memory controller 102. It should be noted that in the following diagrams, NOP represents a "no operation." Since the DQ data is edge-aligned with the DQS signal transition, it needs to be re-aligned (e.g., a 90 degrees phase shift) to capture the READ data within the narrow valid data window (i.e., the data eye). It is the system level skew and skew across multiple DQ lines (resulting in the data valid window moving relative to any fixed clock signal, due to changes in temperature, voltage, or loading, for example) that needs to be managed by the controller 102, and which is a subject of embodiments of the present invention. A DQS delay block (not shown for the sake of simplicity) within the DDR memory controller 102 receives the edge-aligned DQS signal from the DDR memory bank 103 and performs the phase shift (i.e., the memory controller internally delays the received DQS signal to the center of the received data eye). This phase-shifted DQS signal can now be used by the DDR memory controller 102 input registers to capture and de-skew the positive and negative edge DQ data received from the DDR memory bank 103.

Figure 3:
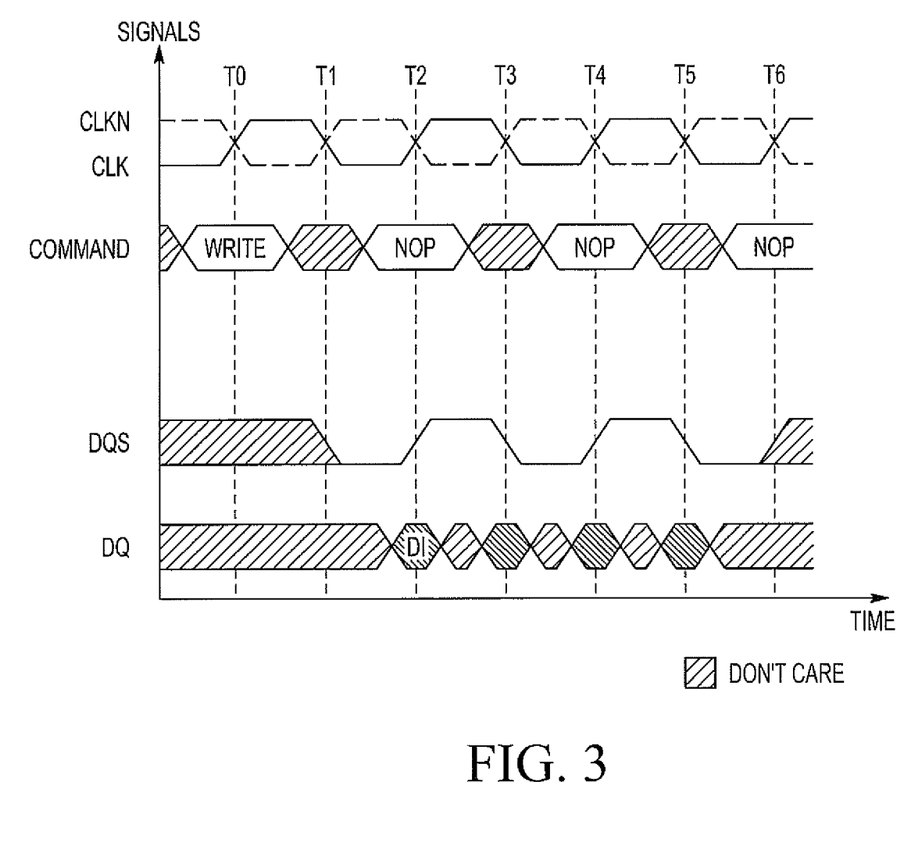
FIG. 3 illustrates an exemplary timing diagram for a WRITE transfer of data in a DDR memory system.

FIG. 3 illustrates an example of a WRITE operation whereby data is written from the DDR memory controller 102 to the DDR memory bank 103. In the DDR memory bank 103, a PLL may be used to generate a phase-shifted clock signal (e.g., 90 degrees) utilized to generate the DQS, address, command, and differential clocks going to the memory circuitry. The DQS is center-aligned by the DDR memory controller 102 with the outgoing DQ data. The address and command signals change at the system clock rate.

Returning to FIG. 1, as previously noted, during WRITE operations, it is the responsibility of the DDR memory controller 102 to center the data with the DQS signal transition for use by the DDR memory bank 103. However, during READ operations, when data is provided by the DDR memory bank 103 to the DDR memory controller 102, the circuitry in the DDR memory bank 103 generates the DQS signal that is returned with the DQ data. The DDR memory controller 102 then shifts this DQS signal using delay circuitry, such as a delay chain, to ensure that the DQS signal transition lies within a location of the data eye (e.g., approximately center) to ensure that the data is captured. Since a DDR memory system is typically implemented with eight byte lanes per DDR memory bank 103, it is important to ensure that the DQS signal transition is placed reasonably at the center location of the data eye for each of the data byte lanes.

Figure 4:
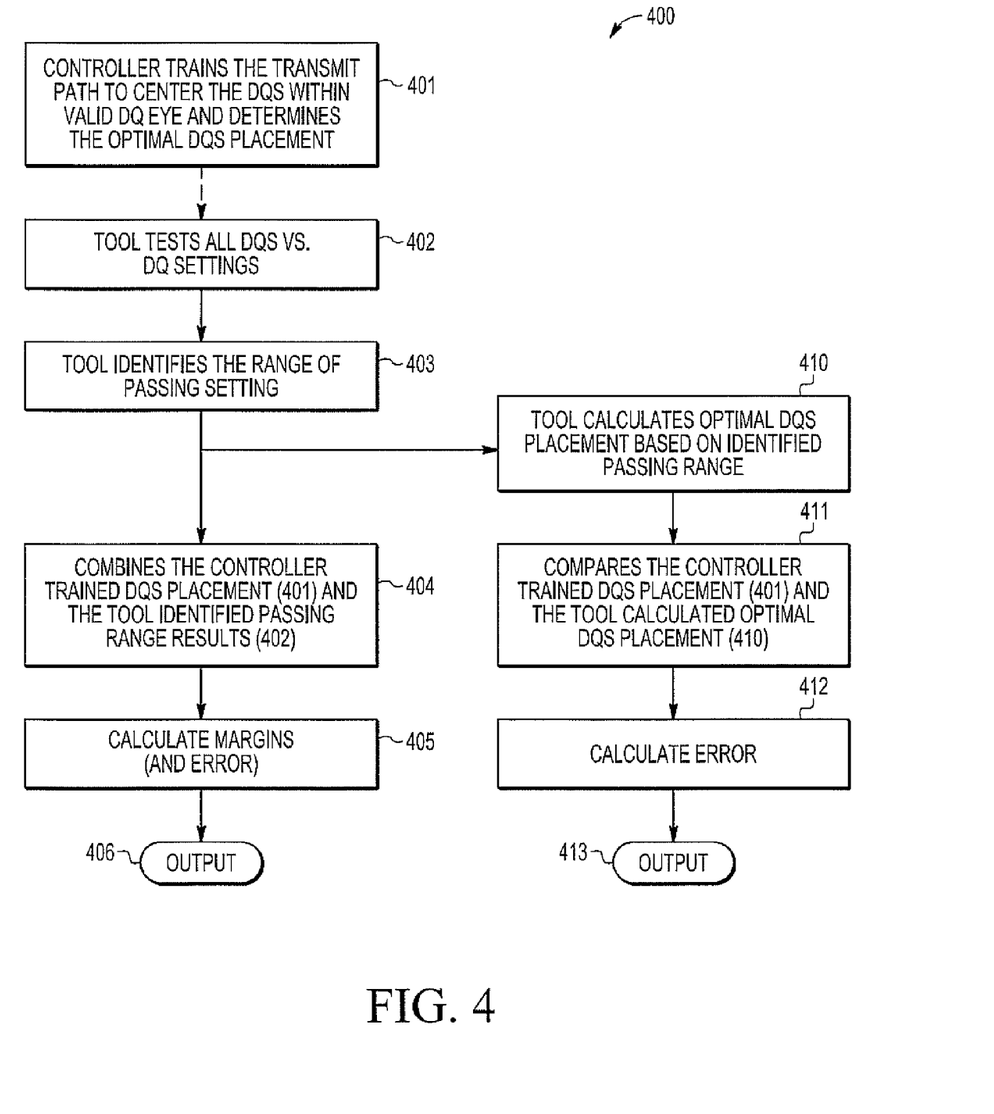
FIG. 4 illustrates a flow diagram configured in accordance with embodiments of the present invention.

A process 400 illustrated in FIG. 4 is operated in accordance with embodiments of the present invention, utilizing the tool 104, which may be coupled to the DDR memory controller 102 by an interface 105. As further described hereinafter, the tool 104 may be implemented and operated within a data processing system 713, which may be external to the PCB 101. Though embodiments of the present invention are described herein with the tool 104 externally implemented from the PCB 101, the present invention is not limited as such. For example, in a system with a multi-core, multi-DDR system on chip ("SoC"), this test could possibly occur on one side of the system, using the other side of the system (e.g., a tool executing on a conservative DDR3 interface could be used to analyze the performance of a high-speed DDR4 interface on the same SoC).

Note that all or a portion of the steps of process 400 may be controlled by the tool 104, which may be implemented in hardware and/or software, such as with a software program. Furthermore, though the process is described with respect to transferring data from the DDR memory bank(s) 103 to the DDR memory controller 102, a similar process may be performed for the transfer of data from the DDR memory controller 102 to the DDR memory bank(s) 103.

In step 401, the DDR memory controller 102 performs a training sequence (such as performed in association with the previously described calibration process during a power-on initialization) with the associated DDR memory bank(s) 103 to which it is coupled when implemented on the PCB 101. Such a training sequence may be run by a state machine (not shown) within the DDR memory controller 102. The purpose of such a training sequence is to train the DDR memory system to center the DQS signal transition within a valid DQ data eye to determine an optimal placement of the DQS signal transition within the data eye. Such a process may be performed by the DDR memory controller 102 sending READ commands to arbitrary, but known, addresses within the DDR memory bank 103 to retrieve predetermined and known data bits, and to then determine if the retrieved bit values match the data that is expected to reside within those addressed data locations within the DDR memory bank 103. Note that the process 400 may further include a step (not shown) whereby the predetermined and known data bits are first written to the known addresses within the DDR memory bank 103.

With each READ command during the training sequence, the DDR memory bank 103 sends the data edge-aligned with the DQS signal transition. When received by the DDR memory controller 102, the training sequence will cause the DDR memory controller 102 to incrementally shift the DQS signal transition with delay circuitry, such as a delay chain. Essentially, this causes the DQS signal transition to be shifted (delayed) across the data eye for reading the data supplied within that data eye. At each successive shifting of the DQS signal transition, a determination is made whether the data read within that data eye matches with the expected value for the data. If it does, then a PASS value is stored for that particular shifted DQS signal transition; if the data does not match, then a FAIL value is associated with that particular shifted DQS signal transition.

Essentially, the result of the foregoing process performed with respect to each byte lane is a Pass/Fail margin table indicating the PASS and FAIL results for each of the shifted DQS signal transitions used to read data from the DDR memory bank 103 into the DDR memory controller 102. Typical training sequences will then select the delay shift of the DQS signal transition (also referred to herein as the "double data rate strobe placement value") so that it lies within the approximate center (approximate center since the limitations of the delay/timing circuitry may not permit the exact center to be selected) of the range of PASS values of the shifted DQS signal transition for each byte lane.

Figure 5:
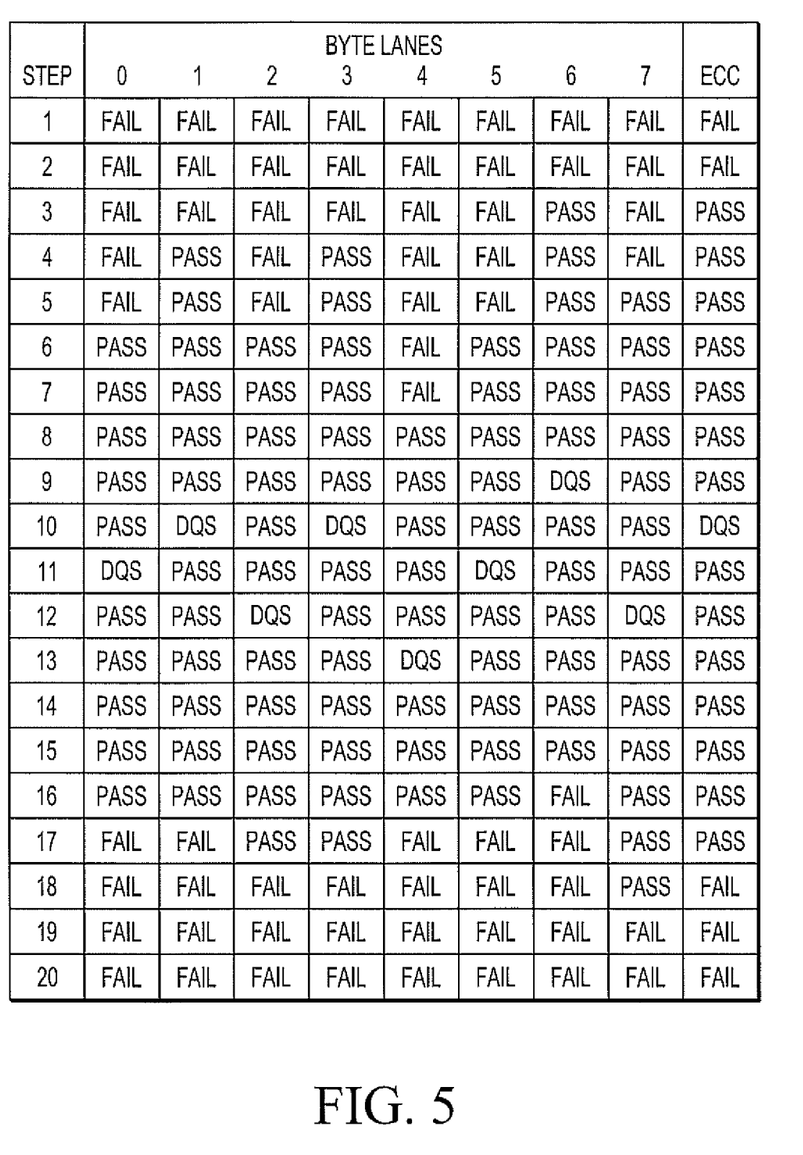
FIG. 5 illustrates an exemplary Pass/Fail training sequence table.

FIG. 5 illustrates an example of such a Pass/Fail training sequence table with the centered DQS signal transitions indicated by the "DQS" labeled cells within each of the columns. Each column represents a data byte lane plus an error correction code ("ECC"). The DQS signal transition for each byte lane can be centered by selecting the N/2 shift increment if the DQS signal transition has been shifted N times across the data eye with a PASS result. Then, within the DDR memory controller 102, for each byte lane, the amount of delay (corresponding to the foregoing selected N/2 shift increment) for centering the DQS signal transition within the data eye for that byte lane is stored so that as the READ operations are thereafter performed during normal operation, the DQS signal transition is approximately centered within the DQ data eye. A storage buffer or register may be utilized to store the selected delay to implement for each byte lane (e.g., in a delay chain). Therefore, during normal operation, each byte lane will use that stored delay for the DQS signal transition to sample the value of data received in each received data eye.

Returning to FIG. 4, the dashed arrow between steps 401 and 402 indicates that these two steps may be performed independent of each other. In step 402, the tool 104 essentially recreates the Pass/Fail table similar to the one performed by step 401. However, in this case, the tool 104 recreates and stores the entire Pass/Fail table externally within the tool 104 (for example, in RAM 714 or hard disk drive 720 in data processing system 713 running the tool 104). The tool 104 may perform the Pass/Fail test using the same incrementally shifted delays of the DQS signal transition as was performed by the training process 401. Or, the PCB 101 manufacturer may elect to perform these Pass/Fail tests by the tool 104 under various different conditions. For example, the Pass/Fail test may be performed by the tool 104 while the PCB 101 is operated under predetermined higher temperatures and/or different delay increments. Essentially, a different data pattern may be used; the tool may use an extensive set of patterns, lengths, terminations, temperatures, voltages, frequencies, etc. Note that the tool 104 does not perform its Pass/Fail test utilizing the same state machine implemented by the DDR memory controller 102 during the training process 401.

In step 403, the tool 104 identifies and stores the range of passing settings of the delayed DQS signal transition for each byte lane, but without having previous knowledge of the location of the DQS signal transition selected within the training process 401.

Figure 6:
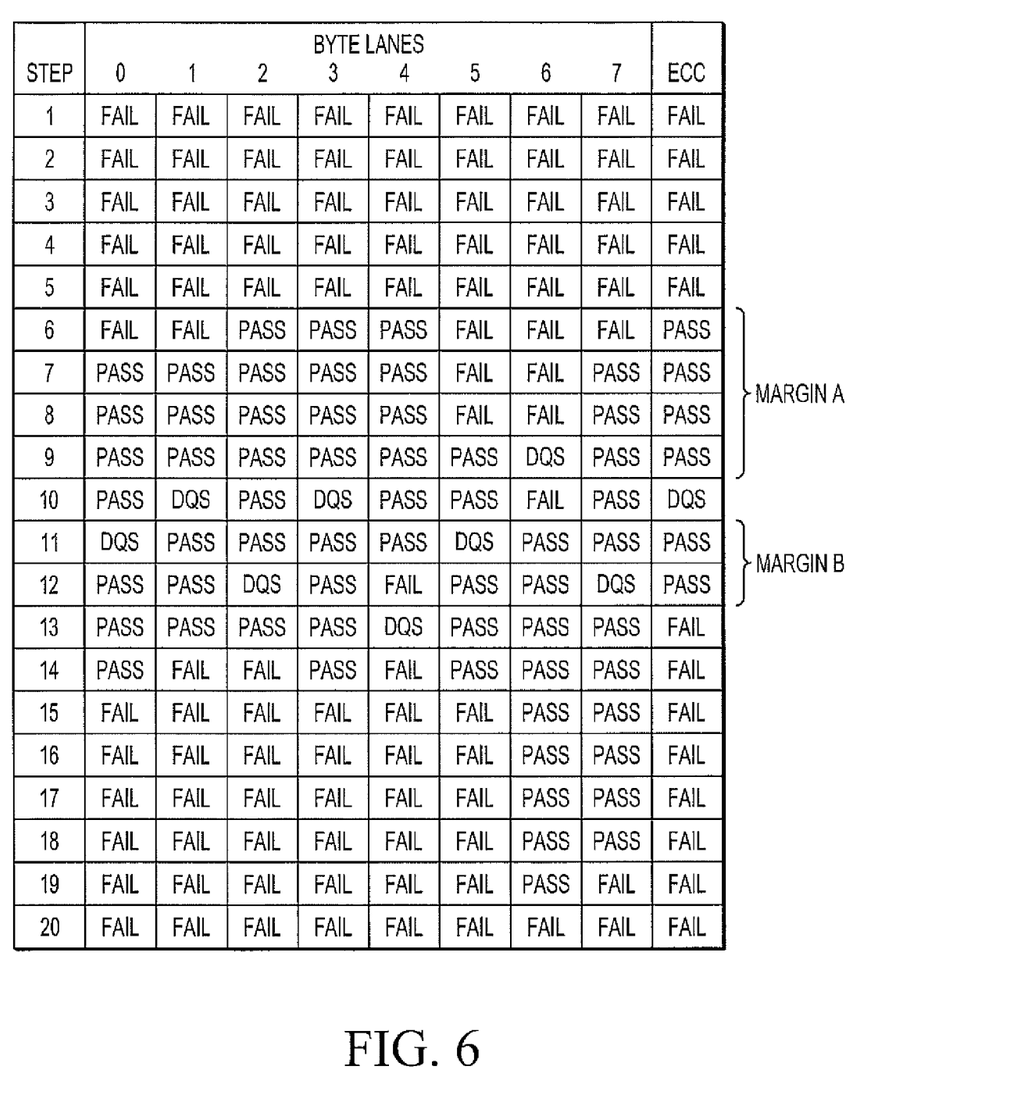
FIG. 6 illustrates an exemplary error margin table produced in accordance with embodiments of the present invention.

In step 404, the tool 104 combines the controller trained DQS signal transition placements produced in step 401 with the passing range results identified within the tool testing process 402. An example of such a combination is illustrated by the margin table of FIG. 6. In this example, the same number of timing steps was performed by the tool testing process 402 as was performed by the training sequence 401, though this is not necessary. The table shows the placements of the DQS strobes, determined by the training sequence 401, within the Pass/Fail ranges determined by the tool testing process 402. As can be noted by comparing the tables of FIGS. 5 and 6, the ranges of Passing results from the tool testing process 402 are not the same as the ranges of Passing values resulting from the training sequence 401 for each of the byte lanes and the ECC. In some or all of the instances, the Passing range is shifted and possibly narrower than the corresponding Passing range determined by the training sequence 401. This may have occurred because the tool testing process 402 may have been performed under more stringent operating conditions, such as more stressful and longer data patterns, to uncover rarely occurring errors. In some instances, the placement of the DQS signal transition within the Pass/Fail ranges determined by the tool testing process 402 for a particular byte lane may result in that placement of the DQS signal transition outside of the range of Passing values for the timing step of that DQS signal transition. In the example shown in FIG. 6, this is the case for byte lanes 4 and 6. Furthermore, for some of the other byte lanes, the placement of the DQS signal transition has been shifted away from the approximate center of the Passing range of values.

In step 405, a comparison is performed between the placement of the DQS signal transition by the training sequence 401 and the range of passing settings determined by the tool 403. The tool 104 calculates margins/errors as a function of the placement of the DQS signal transition by the training sequence 401 into the Pass/Fail ranges determined by the tool testing process 402. As an example, for the ECC column, the margins A and B are determined, which indicate the range of Passing values for delaying the DQS signal transition within the ECC byte lane under the various operating conditions under which the PCB 101 is subjected to by the PCB manufacturer. This provides the PCB manufacturer with an output 406 indicating how well the training sequence 401 will perform with the DDR memory bank(s) 103 within the particular implementation of these chips onto the manufacturer's PCB 101, and all of the associated PCB layouts and operating conditions to which it will be subject to (e.g., extreme temperature ranges for operation). The PCB manufacturer may then determine that the design of the PCB board 101 needs to be modified so that the training sequence performed by the state machine within the DDR memory controller 102 more ideally centers the DQS signal transition within the data eyes in each byte lane during operation of the PCB 101. For example, the PCB manufacturer can then make adjustments to its design and implementation of the components and chips (including the DDR memory controller 102 and DDR memory bank(s) 103 on the PCB 101) so that the training sequence 401 performed during the power-on initialization process by the DDR memory controller 102 produces a DQS signal that is able to consistently capture the data within each of the data eyes received from the DDR memory bank(s) 103. As an example, the PCB manufacturer may adjust its implementation of the PCB 101 so that the margins A and B (see FIG. 6) associated with each of the byte lanes are more approximately equal to each other.

An advantage of the foregoing process is that the combination of the training and testing processes informs the PCB manufacturer how well the DDR memory controller 102 will operate under various designs and operating conditions.

In alternative embodiments, after step 403, the process 400 may proceed to step 410 where the tool 104 calculates an optimal placement of the DQS signal transitions based on the identified Passing ranges provided by step 403. Essentially, step 410 performs a similar process to that which was performed in step 401 by determining the delay that needs to be associated with the DQS signal transitions for each byte lane to approximately center the DQS signal transition within the DQ data eyes. In an example, the tool 104 may determine the optimal DQS signal transition placement by dividing the passing range in half to find the needed amount of delay of the DQS signal transition to center it within the DQ data eye.

Step 411 is then performed in a manner similar as step 404, and step 412 then calculates the errors between the placements of the DQS signal transitions by the tool testing process 402 and the state machine within the DDR memory controller 102 when it performs its training sequence 401. This then may be output 413 to the PCB manufacturer.

Figure 7:
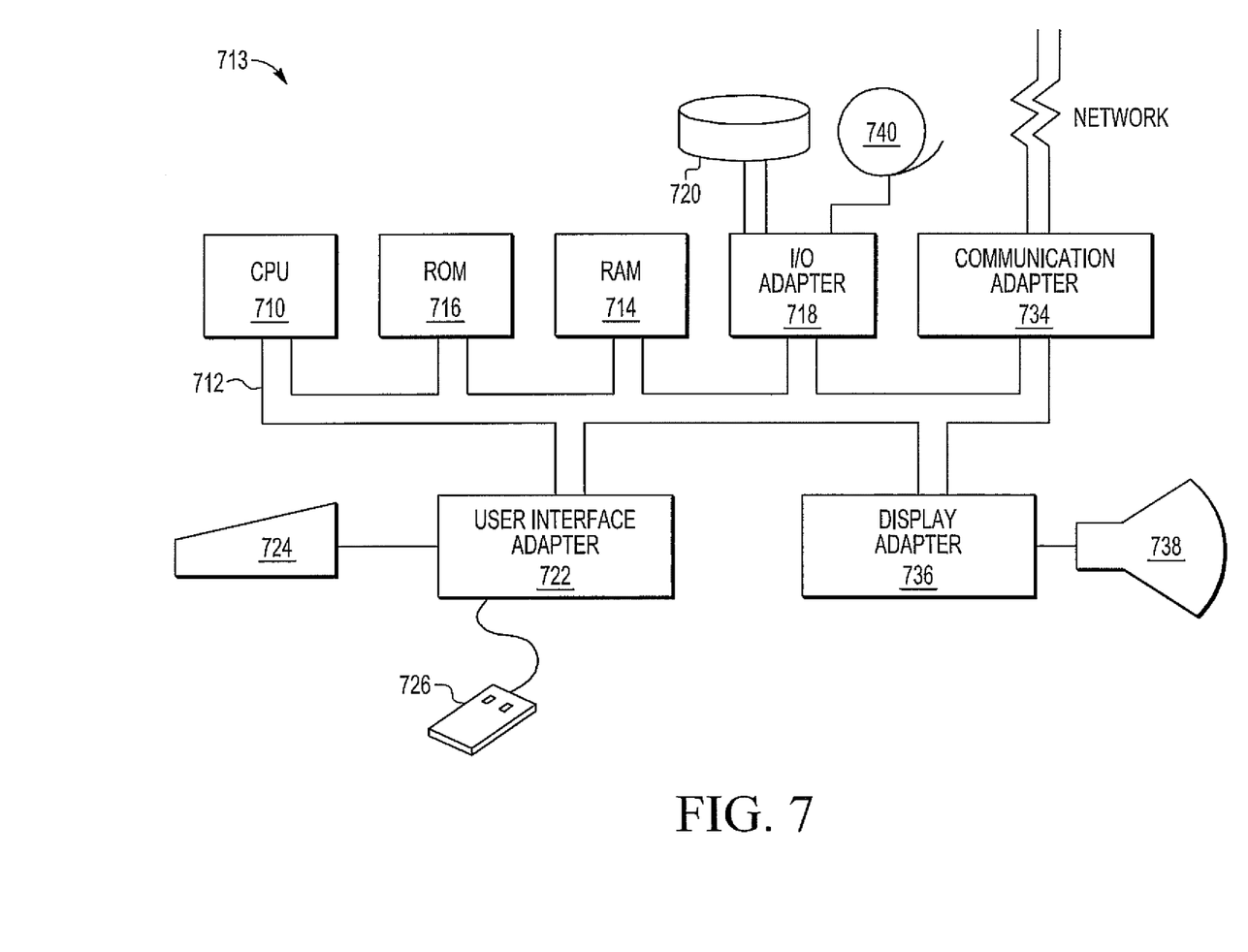
FIG. 7 illustrates a data processing system implemented in accordance with embodiments of the present invention.

With reference now to FIG. 7, a block diagram illustrating a computer system is depicted in which aspects of embodiments of the invention may be implemented. For example, the PCB 101 may be implemented within a computer system 713, such as for all or a portion of the RAM 714. Further, a computer system 713 may be utilized to implement and operate the tool 104.

Computer system 713 may employ a peripheral component interconnect ("PCI") local bus architecture. Although the depicted example employs a PCI bus, other bus architectures such as Accelerated Graphics Port ("AGP") and Industry Standard Architecture ("ISA") may be used, among others. Processor ("CPU") 710, volatile memory ("RAM") 714, and non-volatile memory ("ROM") 716 may be connected to PCI local bus 712 through a PCI Bridge (not shown). The PCI Bridge also may include an integrated memory controller and cache memory for processor 710. Additional connections to PCI local bus 712 may be made through direct component interconnection or through add-in boards. In the depicted example, a network communications adapter 734, small computer system interface ("SCSI") host bus adapter (not shown), and expansion bus interface (not shown) may be connected to PCI local bus 712 by direct component connection. In contrast, audio adapter (not shown), graphics adapter (not shown), and audio display adapter (not shown) may be connected to PCI local bus 712 by add-in boards inserted into expansion slots. A display device 738 may be connected to the PCI local bus by the display adapter 736. The outputs 406 and/or 413 of process 400 may be performed by the display device 738.

A user interface adapter 77 provides a connection for a keyboard 724 and mouse 726, modem (not shown), and additional memory (not shown). I/O adapter 718 provides a connection for a hard disk drive 720, tape drive 740, and CD-ROM drive (not shown). Typical PCI local bus implementations will support three or four PCI expansion slots or add-in connectors.

An operating system may be run on processor 715 and used to coordinate and provide control of various components within computer system 713. The operating system may be a commercially available operating system. An object oriented programming system such as Java may run in conjunction with the operating system and provide calls to the operating system from Java programs or programs executing on system 713. Instructions for the operating system, the object-oriented operating system, and programs may be located on non-volatile memory 716, and/or storage devices, such as a hard disk drive 720, and may be loaded into volatile memory 714 for execution by processor 710.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the process 400 of the present invention may be applied to a multiprocessor computer system.

As another example, computer system 713 may be a stand-alone system configured to be bootable without relying on some type of network communication interface, whether or not computer system 713 includes some type of network communication interface. As a further example, computer system 713 may be an embedded controller, which is configured with ROM and/or flash ROM providing non-volatile memory storing operating system files or user-generated data.

The depicted example in FIG. 7 and above-described examples are not meant to imply architectural limitations. Further, a computer program form of the present invention may reside on any computer readable storage medium (i.e., floppy disk, compact disk, hard disk, tape, ROM, RAM, etc.) used by a computer system. (The terms "computer," "system," and "computer system" may be used interchangeably herein.)

As will be appreciated by one skilled in the art, aspects of the process 400 in tool 104 may be embodied as a system, method, and/or program product (e.g., running on system 713). Accordingly, aspects of the process 400 in tool 104 may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the process 400 in tool 104 may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory ("RAM") (e.g., RAM 714), a read-only memory ("ROM") (e.g., ROM 716), an erasable programmable read-only memory ("EPROM" or Flash memory), an optical fiber, a portable compact disc read-only memory ("CD-ROM"), an optical storage device, a magnetic storage device (e.g., hard disk drive 720), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowcharts and block diagrams in the figures illustrate architecture, functionality, and operation of possible implementations of systems, methods and program products according to various embodiments of the present invention. In this regard, each block in the flowcharts or block diagrams may represent a module, segment, or portion of code, which comprises one or more executable program instructions for implementing the specified logical function(s). It should also be noted that, in some implementations, the functions noted in the blocks may occur out of the order noted in the figures. For example, two blocks shown in succession may, in fact, be executed substantially concurrently (e.g., steps 401 and 402), or the blocks may sometimes be executed in the reverse order, depending upon the functionality involved.

Modules implemented in software for execution by various types of processors (e.g., processor 710) may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system (e.g., system 713) or network.

These program instructions may be provided to a processor (e.g., processor 710) and/or controller of a general purpose computer, special purpose computer, or other programmable data processing apparatus (e.g., controller) to produce a machine (e.g., system 713), such that the instructions, which execute via the processor of the computer or other programmable data processing apparatus, create means for implementing the functions/acts specified in the flowchart and/or block diagram block or blocks.

It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the process 400 in tool 104 may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables (e.g., the tables described with respect to FIGS. 5 and 6).

Association of certain data (for example, the Pass/Fail data produced by step 401 and step 402) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Aspects of the present invention provide a tool for testing double data rate transfers of data between a memory controller and a memory device. The tool includes circuitry for receiving a double data rate strobe placement value indicating where a training sequence performed by the memory controller has placed a double data rate strobe transition within a data eye transferred between the memory device and the memory controller, circuitry for receiving a range of double data rate strobe transition settings that transferred data during a testing of double data rate transfers between the memory controller and the memory device by the tool, circuitry for comparing the double data rate strobe placement value to the range of double data rate strobe transition settings, and circuitry for outputting information representing where the double data rate strobe placement value resides within the range of double data rate strobe transition settings. The training sequence may be performed during a power-on initialization of the memory controller. The memory controller may be coupled to the memory device on a printed circuit board, wherein the tool may be implemented externally from the printed circuit board. The double data rate strobe placement value represents an amount of time delay for approximately centering the double data rate strobe transition within the data eye. The double data rate transfers may be transfers of data from the memory device to the memory controller. The double data rate transfers may be transfers of data from the memory controller to the memory device.

Aspects of the present invention provide a method for testing double data rate transfers of data between a memory controller and a memory device, wherein the method includes receiving a double data rate strobe placement value indicating where a training sequence performed by the memory controller has placed a double data rate strobe transition within a data eye transferred between the memory device and the memory controller, receiving a range of double data rate strobe transition settings that transferred data during a testing of double data rate transfers between the memory controller and the memory device, comparing the double data rate strobe placement value to the range of double data rate strobe transition settings, and outputting information representing where the double data rate strobe placement value resides within the range of double data rate strobe transition settings. The training sequence may be performed during a power-on initialization of the memory controller. The range of double data rate strobe transition settings includes successful and failed data transfers between the memory controller and the memory device. The double data rate strobe placement value represents an amount of time delay for approximately centering the double data rate strobe transition within the data eye. The testing of double data rate transfers between the memory controller and the memory device may be performed independently from the training sequence. The information representing where the double data rate strobe placement value resides within the range of double data rate strobe transition settings comprises how much the double data rate strobe transition can shift within the data eye before failing to successfully transfer data between the memory controller and the memory device.

Aspects of the present invention provide a method for designing a double data rate ("DDR") memory system comprising a DDR memory controller coupled to a DDR memory device. The method performs a training sequence in which the DDR memory controller conducts transfers of test data between the DDR memory device and the DDR memory controller to establish a timing location of an initial DDR data strobe with respect to its corresponding data line coupled between the DDR memory device and the DDR memory controller. The method also performs a testing process that is operated independently from the training sequence wherein the testing process sweeps a DDR data strobe transition across repeated transfers of the test data between the DDR memory device and the DDR memory controller, resulting in a data set indicating which of the repeated transfers of the test data correctly and incorrectly captured the test data. The method compares the timing location of the initial DDR data strobe to the data set indicating which of the repeated transfers of the test data correctly and incorrectly captured the test data, the comparison resulting in an output indicating how much margin for error there is for the initial DDR data strobe to shift and still correctly capture the test data. The method may adjust the timing location of the initial DDR data strobe as a function of the output indicating how much margin for error there is for the initial DDR data strobe to shift and still correctly capture the test data. The method may adjust the DDR memory system as a function of the margin for error there is for the initial DDR data strobe to shift and still correctly capture the test data. The adjustment of the DDR memory system as a function of the margin for error there is for the initial DDR data strobe to shift and still correctly capture the test data may include modifying circuitry coupling the DDR memory controller to the DDR memory device to thereby modify the margin for error there is for the initial DDR data strobe to shift and still correctly capture the test data. The margin of error may be modified so that the timing location of the initial DDR data strobe is substantially centered within a data eye representing a range of DDR data strobe timing locations that would correctly capture the test data transferred on the corresponding data line. The DDR memory system may include the DDR memory controller coupled to the DDR memory device on a printed circuit board. The training sequence may be controlled by a state machine in the DDR memory controller. The testing process may be controlled by a tool implemented externally from the printed circuit board. The testing process may be performed on the DDR memory system as it is being operated under physical conditions different from when it was being operated under the training sequence.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Benefits, advantages and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention, or other matter disclosed under the headings.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "a," "an," and "the" may be intended to include the plural forms as well, unless the context clearly indicates otherwise. It will be further understood that the terms "comprises" and/or "comprising," when used in this specification, which may include the claims herein below, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below may be intended to include any structure, material, or act for performing the function in combination with other claimed elements as specifically claimed.

Unless otherwise indicated, all numbers expressing quantities of timing delay increments, and so forth used in the specification and claims are to be understood as being modified in all instances by the term "about" or "approximately." Accordingly, unless indicated to the contrary, the numerical parameters set forth in this specification and attached claims are approximations that can vary depending upon the desired properties sought to be obtained by the presently disclosed subject matter.

What is claimed is:

1. A tool for testing double data rate transfers of data between a memory controller and a memory device, the tool comprising:
   circuitry for receiving a double data rate strobe placement value indicating where a training sequence performed by the memory controller has placed a double data rate strobe transition within a data eye transferred between the memory device and the memory controller, wherein the double data rate strobe transition is transferred along with the data eye between the memory device and the memory controller;
   circuitry for receiving a range of double data rate strobe transition settings that transferred data during a testing of double data rate transfers between the memory controller and the memory device by the tool;
   circuitry for comparing the double data rate strobe placement value to the range of double data rate strobe transition settings; and
   circuitry for outputting information representing where the double data rate strobe placement value resides within the range of double data rate strobe transition settings.

2. The tool as recited in claim 1, wherein the training sequence is performed during a power-on initialization of the memory controller.

3. The tool as recited in claim 1, wherein the memory controller is coupled to the memory device on a printed circuit board, wherein the tool is implemented externally from the printed circuit board.

4. The tool as recited in claim 1, wherein the double data rate strobe placement value represents an amount of time delay for approximately centering the double data rate strobe transition within the data eye.

5. The tool as recited in claim 1, wherein the double data rate transfers are transfers of data from the memory device to the memory controller.

6. The tool as recited in claim 1, wherein the double data rate transfers are transfers of data from the memory controller to the memory device.

7. The tool as recited in claim 1, wherein the training sequence is performed by the memory controller operating under first physical conditions comprising a first temperature, and wherein the testing by the tool of double data rate transfers between the memory controller and the memory device is performed with the memory controller operating under second physical conditions comprising a second temperature different from the first temperature.

8. The tool as recited in claim 1, further comprising:
   circuitry in the tool for determining an optimal double data rate strobe transition setting based on the range of double data rate strobe transition settings that transferred data during the testing of double data rate transfers between the memory controller and the memory device by the tool;
   circuitry in the tool for comparing the double data rate strobe placement value to the optimal double data rate strobe transition setting; and
   circuitry in the tool for outputting a difference between the double data rate strobe placement value and the optimal double data rate strobe transition setting.

9. The tool as recited in claim 1, further comprising circuitry in the tool for storing each of a plurality of double data rate strobe transition settings within the range, whereby each of the plurality of double data rate strobe transition settings within the range comprises either (1) an indication that the double data rate strobe transition setting successfully transferred the data between the memory controller and the memory device, or (2) an indication that the double data rate strobe transition setting failed to successfully transfer the data between the memory controller and the memory device, wherein the circuitry for comparing the double data rate strobe placement value to the range of double data rate strobe transition settings stores a relative location of the double data rate strobe placement value within the stored plurality of double data rate strobe transition settings within the range.

10. The tool as recited in claim 1, wherein the double data rate strobe transition is generated by the memory device and transferred along with the data eye from the memory device to the memory controller.

11. A method for testing double data rate transfers of data between a memory controller and a memory device, the method comprising:
   receiving a double data rate strobe placement value indicating where a training sequence performed by the memory controller has placed a double data rate strobe transition within a data eye transferred between the memory device and the memory controller, wherein the double data rate strobe transition is transferred along with the data eye between the memory device and the memory controller;

receiving a range of double data rate strobe transition settings that transferred data during a testing of double data rate transfers between the memory controller and the memory device;

comparing the double data rate strobe placement value to the range of double data rate strobe transition settings; and outputting information representing where the double data rate strobe placement value resides within the range of double data rate strobe transition settings.

12. The method as recited in claim 11, further comprising performing the training sequence during a power-on initialization of the memory controller.

13. The method as recited in claim 11, wherein the range of double data rate strobe transition settings includes successful and failed data transfers between the memory controller and the memory device.

14. The method as recited in claim 11, wherein the double data rate strobe placement value represents an amount of time delay for approximately centering the double data rate strobe transition within the data eye.

15. The method as recited in claim 11, wherein the testing of double data rate transfers between the memory controller and the memory device is performed independently from the training sequence.

16. The method as recited in claim 11, wherein information representing where the double data rate strobe placement value resides within the range of double data rate strobe transition settings comprises how much the double data rate strobe transition can shift within the data eye before failing to successfully transfer data between the memory controller and the memory device.

17. The method as recited in claim 11, further comprising determining an optimal double data rate strobe transition setting based on the range of double data rate strobe transition settings that transferred data during the testing of double data rate transfers between the memory controller and the memory device, wherein the optimal double data rate strobe transition setting is not the same as the double data rate strobe placement value determined by the memory controller.

18. A method for designing a double data rate ("DDR") memory system comprising a DDR memory controller coupled to a DDR memory device, the method comprising:

performing a training sequence comprising the DDR memory controller conducting transfers of test data between the DDR memory device and the DDR memory controller to establish a timing location of an initial DDR data strobe with respect to its corresponding data line coupled between the DDR memory device and the DDR memory controller;

performing a testing process that is operated independently from the training sequence wherein the testing process comprises sweeping a DDR data strobe transition across repeated transfers of the test data between the DDR memory device and the DDR memory controller, the testing process resulting in a data set indicating which of the repeated transfers of the test data correctly and incorrectly captured the test data;

comparing the timing location of the initial DDR data strobe to the data set indicating which of the repeated transfers of the test data correctly and incorrectly captured the test data, the comparison resulting in an output indicating how much margin for error there is for the initial DDR data strobe to shift and still correctly capture the test data; and adjusting the DDR memory system as a function of the margin for error there is for the initial DDR data strobe to shift and still correctly capture the test data, wherein the adjusting of the DDR memory system as a function of the margin for error there is for the initial DDR data strobe to shift and still correctly capture the test data further comprises modifying circuitry coupling the DDR memory controller to the DDR memory device to thereby modify the margin for error there is for the initial DDR data strobe to shift and still correctly capture the test data, wherein the margin of error is modified so that the timing location of the initial DDR data strobe is substantially centered within a data eye representing a range of DDR data strobe timing locations that would correctly capture the test data transferred on the corresponding data line.

19. The method as recited in claim 18, further comprising adjusting the timing location of the initial DDR data strobe as a function of the output indicating how much margin for error there is for the initial DDR data strobe to shift and still correctly capture the test data.

20. A method for designing a double data rate ("DDR") memory system comprising a DDR memory controller coupled to a DDR memory device, the method comprising:

performing a training sequence comprising the DDR memory controller conducting transfers of test data between the DDR memory device and the DDR memory controller to establish a timing location of an initial DDR data strobe with respect to its corresponding data line coupled between the DDR memory device and the DDR memory controller;

performing a testing process that is operated independently from the training sequence wherein the testing process comprises sweeping a DDR data strobe transition across repeated transfers of the test data between the DDR memory device and the DDR memory controller, the testing process resulting in a data set indicating which of the repeated transfers of the test data correctly and incorrectly captured the test data;

comparing the timing location of the initial DDR data strobe to the data set indicating which of the repeated transfers of the test data correctly and incorrectly captured the test data, the comparison resulting in an output indicating how much margin for error there is for the initial DDR data strobe to shift and still correctly capture the test data; and adjusting the DDR memory system as a function of the margin for error there is for the initial DDR data strobe to shift and still correctly capture the test data, wherein the adjusting of the DDR memory system as a function of the margin for error there is for the initial DDR data strobe to shift and still correctly capture the test data further comprises modifying circuitry coupling the DDR memory controller to the DDR memory device to thereby modify the margin for error there is for the initial DDR data strobe to shift and still correctly capture the test data, wherein the DDR memory system comprises the DDR memory controller coupled to the DDR memory device on a printed circuit board.

21. The method as recited in claim 20, wherein the training sequence is controlled by a state machine in the DDR memory controller, and wherein the testing process is controlled by a tool implemented externally from the printed circuit board.

22. The method as recited in claim 20, wherein the adjusting of the DDR memory system further comprises adjusting a design of how the DDR memory device and the DDR memory controller are physically coupled to each other on the printed circuit board.

* * * * *